(12) United States Patent
Hoffstein et al.

(10) Patent No.: US 7,308,097 B2
(45) Date of Patent: Dec. 11, 2007

(54) DIGITAL SIGNATURE AND AUTHENTICATION METHOD AND APPARATUS

(75) Inventors: Jeffrey Hoffstein, Pawtucket, RI (US); Nicholas A. Howgrave-Graham, Arlington, MA (US); Jill C. Pipher, Pawtucket, RI (US); Joseph H. Silverman, Needham, MA (US); William J. Whyte, Somerville, MA (US)

(73) Assignee: NTRU Cryptosystems, Inc., Acton, MA (US)

( * ) Notice: Subject to any disclaimer, the term of this patent is extended or adjusted under 35 U.S.C. 154(b) by 889 days.

(21) Appl. No.: 10/313,082

(22) Filed: Dec. 6, 2002

(65) Prior Publication Data
US 2003/0120929 A1    Jun. 26, 2003

Related U.S. Application Data

(60) Provisional application No. 60/338,330, filed on Dec. 7, 2001.

(51) Int. Cl.
*H04K 1/00*    (2006.01)
*H04L 9/00*    (2006.01)

(52) U.S. Cl. .............................. 380/28; 380/30; 380/44; 380/282; 380/285; 380/277; 713/170; 713/176; 713/180; 713/181

(58) Field of Classification Search ............... 713/170, 713/180, 168, 176, 181; 380/28, 30, 280, 380/285, 44, 277, 282
See application file for complete search history.

(56) References Cited

U.S. PATENT DOCUMENTS

| | | | |
|---|---|---|---|
| 4,995,082 A | 2/1991 | Schnorr | 380/23 |
| 5,220,606 A | 6/1993 | Greenberg | 350/43 |
| 5,375,170 A * | 12/1994 | Shamir | 380/30 |
| 5,646,998 A | 7/1997 | Stambler | 380/25 |
| 5,790,675 A | 8/1998 | Patarin | 380/23 |
| 5,796,840 A | 8/1998 | Davis | 380/50 |
| 6,081,597 A * | 6/2000 | Hoffstein et al. | 380/28 |
| 6,148,084 A | 11/2000 | Brands | 380/279 |

(Continued)

FOREIGN PATENT DOCUMENTS

EP    0899907 A2    3/1999

(Continued)

OTHER PUBLICATIONS

Buchman, J. et al., A One Way Function Based on Ideal Arithmetic in Number Fields, Advances in Cryptology, Crypto '97, Springer-Verlag, 1997 pp. 386-394.

(Continued)

*Primary Examiner*—Kim Vu
*Assistant Examiner*—Beemnet W Dada
(74) *Attorney, Agent, or Firm*—Martin Novack

(57) ABSTRACT

A method, system and apparatus for performing user identification, digital signatures and other secure communication functions in which keys are chosen essentially at random from a large set of vectors and key lengths are comparable to the key lengths in other common identification and digital signature schemes at comparable security levels. The signing technique of an embodiment of the identification/digital signature scheme hereof uses a mixing system based on multiplication in a ring and reduction modulo an ideal q in that ring; while the verification technique uses special properties of products of elements whose validity depends on elementary probability theory. The security of the identification/digital signature scheme comes from the interaction of reduction modulo q and the difficulty of forming products with special properties.

24 Claims, 4 Drawing Sheets

U.S. PATENT DOCUMENTS

| | | | | |
|---|---|---|---|---|
| 6,157,721 | A | 12/2000 | Shear et al. | 380/255 |
| 6,651,167 | B1* | 11/2003 | Terao et al. | 713/168 |
| 6,959,085 | B1* | 10/2005 | Hoffstein et al. | 380/30 |
| 7,079,650 | B1* | 7/2006 | Knudsen | 380/30 |
| 7,200,225 | B1* | 4/2007 | Schroeppel | 380/28 |
| 7,218,734 | B2* | 5/2007 | Blakely et al. | 380/28 |
| 2002/0136401 | A1* | 9/2002 | Hoffstein et al. | 380/30 |

FOREIGN PATENT DOCUMENTS

| | | |
|---|---|---|
| JP | 11-073105 | 3/1999 |

OTHER PUBLICATIONS

Random Small Hamming Weight Products With Applications to Cryptography, Jeffery Hoffstein and Joseph Silverman, NTRU, Burlington, MA, 2000.

Optimization for NTRU, Jeffrey Hoffstein, Joseph Silverman pp. 1-12, 2000.

Polynomial Rings and Efficient Public Key Authentication II, Jeffrey Hoffstein and Joseph H. Silverman, pp. 1-17, 1999.

MiniPASS: Authentication and Digital Signatures in a Constrained Environment, Jeffrey Hoffstein, Joseph H. Silverman, pp. 1-13, 2000.

NTRU: A Ring-Based Public Key Cryptosystem, Jeffrey Hoffstein, Jill Pipher and Joseph H. Silverman, 1998.

The NTRU Public Key Cryptosystem (tutorial), pp. 1-7, 2001.

PASS—The Polynomial Authentication and Signature Scheme (tutorial), pp. 1-8, 2001.

Goldreich et al. "Public-key cryptography from lattice reduction problems." *Proceedings of CRYPTO '97, Lecture Notes in Computer Science 1294* (1997).

Guillou L.C. et al. "A Practical Zero-Knowledge Protocol Fitted to Security Microprocessor Minimizing Both Transmission and Memory." *Advances in Cryptology—Eurocrypt '88, Lecture Notes in Computer Science 330* (1988) pp. 123-128.

Hoffstein J. et al. "An NTRU Lattice Based Signature Scheme" *Advances in Cryptology—Eurocrypt '01, Lecture Notes in Computer Science* (2001).

Hoffstein, J. et al. "Polynomial Rings and Efficient Public Key Authentication" *Proceeding of the International Workshop on Cryptographic Techniques and E-Commerce* (1999).

Hoffstein, J. et al. "NTRUSign: Digital Signatures Using the NTRU Lattice" Preliminary Draft 2 *CT-RSA 2003 Proceedings* (2002).

Schnorr, C.P. "Efficient Identification and Signatures for Smart Cards." *Advances in Cryptology—Crypto '89, Lecture Notes in Computer Science 435* (1990) pp. 239-252.

* cited by examiner

DIGITAL SIGNATURE AND AUTHENTICATION METHOD AND APPARATUS

FIELD OF THE INVENTION

The present invention relates generally to secure communication and document identification over computer networks or other types of communication systems and, more particularly, to secure user identification and digital signature techniques based on rings and ideals. The invention also has application to communication between a card, such as a "smart card", or other media, and a user terminal.

BACKGROUND OF THE INVENTION

User identification techniques provide data security in a computer network or other communications system by allowing a given user to prove its identity to one or more other system users before communicating with those users. The other system users are thereby assured that they are in fact communicating with the given user. The users may represent individual computers or other types of terminals in the system. A typical user identification process of the challenge-response type is initiated when one system user, referred to as the Prover, receives certain information in the form of a challenge from another system user, referred to as the Verifier. The Prover uses the challenge and the Prover's private key to generate a response, which is sent to the Verifier. The Verifier uses the challenge, the response and a public key to verify that the response was generated by a legitimate prover. The information passed between the Prover and the Verifier is generated in accordance with cryptographic techniques which insure that eavesdroppers or other attackers cannot interfere with the identification process.

It is well known that a challenge-response user identification technique can be converted to a digital signature technique by the Prover utilizing a one-way hash function to simulate a challenge from a Verifier. In such a digital signature technique, a Prover applies the one-way hash function to a message to generate the simulated challenge. The Prover then utilizes the simulated challenge and a private key to generate a digital signature, which is sent along with the message to the Verifier. The Verifier applies the same one-way hash function to the message to recover the simulated challenge and uses the challenge and a public key to validate the digital signature.

One type of user identification technique relies on the one-way property of the exponentiation function in the multiplicative group of a finite field or in the group of points on an elliptic curve defined over a finite field. This technique is described in U.S. Pat. No. 4,995,082 and in C. P. Schnorr, "Efficient Identification and Signatures for Smart Cards," in G. Brassard, ed., Advances in Cryptology—Crypto '89, Lecture Notes in Computer Science 435, Springer-Verlag, 1990, pp. 239-252. This technique involves the Prover exponentiating a fixed base element g of the group to some randomly selected power k and sending it to the verifier. An instance of the Schnorr technique uses two prime numbers p and q chosen at random such that q divides p−1, and a number g of order q modulo p is selected. The numbers p, q, and g are made available to all users. The private key of the Prover is x modulo q and the public key y of the Prover is $g^{-x}$ modulo p. The Prover initiates the identification process by selecting a random non-zero number z modulo q. The Prover computes the quantity $g^z$ modulo p and sends it as a commitment to the Verifier. The Verifies selects a random number w from the set of integers $\{1, 2, \ldots, 2^t\}$ where t is a security number which depends on the application and in the above-cited article is selected as 72. The Verifier sends w as a challenge to the Prover. The Prover computes a quantity u that is equal to the quantity z+xw modulo q as a response and sends it to the Verifier. The Verifier accepts the Prover as securely identified if $g^z$ is found to be congruent modulo p to the quantity $g^u y^w$.

Another type of user identification technique relies on the difficulty of factoring a product of two large prime numbers. A user identification technique of this type is described in L. C. Guillou and J. J. Quisquater, "A Practical Zero-Knowledge Protocol Fitted to Security Microprocessor Minimizing Both Transmission and Memory," in C. G. Gunther, Ed. Advances in Cryptology—Eurocrypt '88, Lecture Notes in Computer Science 330, Springer-Verlag, 1988, pp. 123-128. This technique involves a Prover raising a randomly selected argument g to a power b modulo n and sending it to a Verifier. An instance of the Guillou-Quisquater technique uses two prime numbers p and q selected at random, a number n generated as the product of p and q, and a large prime number b also selected at random. The numbers n and b are made available to all users. The private key of the Prover is x modulo n and the public key y of the Prover is $x^{-b}$ modulo n. The Prover initiates the identification process by randomly selecting the number g from the set of non-zero numbers modulo n. The Prover computes the quantity $g^b$ modulo n and sends it as a commitment to the Verifier. The Verifier randomly selects a number c from the set of non-zero numbers modulo b and sends c as a challenge to the Prover. The Prover computes the number h that is equal to the quantity $gx^c$ modulo n as a response and sends it to the Verifier. The Verifier accepts the Prover as securely identified if $g^b$ is found to be congruent modulo n to $h^b y^c$.

Another type of user identification technique relies on the difficulty of finding a polynomial with small coefficients taking a specified set of values modulo q. A user identification technique of this type is described in Jeffrey Hoffstein, Daniel Lieman, Joseph H. Silverman, Polynomial Rings and Efficient Public Key Authentication, Proceeding of the International Workshop on Cryptographic Techniques and E-Commerce (CrypTEC '99), M. Blum and C. H. Lee, eds., City University of Hong Kong Press. This technique involves a Prover choosing polynomials with small coefficients and publishing the values modulo q at X=b for values of b in a set S. The Prover also selects commitment polynomials with small coefficients and sends their values at X=b for b in S to the Verifier. The Verifier chooses small polynomials as the challenge and sends them to the Prover. The Prover computes and sends to the Verifier a polynomial formed from the various other polynomials as the response. The Verifier accepts the Prover as securely identified if the response polynomial has small coefficients and has the correct value at X=b for every value of b in S.

Another type of user identification technique relies on the difficulty of finding close vectors in a lattice. An identification technique of this type is described in Goldreich, S. Goldwasser, and S. Halevi, Public-key cryptography from lattice reduction problems, Proceedings of CRYPTO'97, Lecture Notes in Computer Science 1294, Springer-Verlag, 1997. In this method an almost orthogonal basis for a lattice is selected as a secret key and a non-orthogonal basis of the same lattice is published as the public key. The Verifier chooses a random vector (via a secure hash function) as the challenge. The Prover uses the good almost orthogonal basis to find a lattice vector that is close to the challenge vector and sends this lattice vector to the Verifier. The Verifier accepts the Prover as securely identified if the response vector is in the lattice and is sufficiently close to the challenge vector. In the method of Goldreich, Goldwasser, and Halevi, the public key is a complete basis for a randomly selected lattice, and thus has size on the order of $N^2$ bits for a lattice of dimension N. The large size of the public key makes this method impractical for many applications.

Another type of user identification technique that also relies on the difficulty of finding close vectors in a lattice is described in J. Hoffstein, J. Pipher, and J. H. Silverman, NSS: An NTRU Lattice-Based Signature Scheme, Advances in Cryptology-Eurocrypt '01, Lecture Notes in Computer Science, Springer-Verlag, 2001. In this method the lattice has a convolution modular structure, which allows the public key (i.e., the lattice) to be described using a single vector of size on the order of $N*\log(N)$ bits. However, this method uses an auxiliary prime to attach the challenge to the lattice point, which renders it insecure.

Although the above-described Schnorr, Guillou-Quisquater, Hoffstein-Lieman-Silverman, Goldreich-Goldwasser-Halevi, and Hoffstein-Pipher-Silverman techniques can provide acceptable performance in many applications, there is a need for an improved technique which can provide security and greater computational efficiency than these and other prior art techniques.

SUMMARY OF THE INVENTION

The present invention provides a method, system and apparatus for performing user identification, digital signatures and other secure communication functions. Keys are chosen essentially at random from a large set of vectors and key lengths are comparable to the key lengths in other common identification and digital signature schemes at comparable security levels. The signing and verifying techniques hereof provide substantial improvements in computational efficiency, key size, footprint, and/or processing requirements over earlier techniques.

The signing technique of an embodiment of the identification/digital signature scheme hereof uses a mixing system based on multiplication in a ring and reduction modulo an ideal q in that ring; while the verification technique uses special properties of products of elements whose validity depends on elementary probability theory. The security of the identification/digital signature scheme comes from the interaction of reduction modulo q and the difficulty of forming products with special properties. In an embodiment of the identification/digital signature scheme hereof that employs a quotient ring of polynomials, the security also relies on the experimentally observed fact that for most lattices, it is very difficult to find a vector whose length is only a little bit longer than the shortest vector, and it is also difficult to find a lattice vector that is quite close to a randomly chosen nonlattice vector.

In accordance with one aspect of the invention, a secure user identification technique is provided in which one of the system users, referred to as the Prover, creates private key elements f and g of the ring R and creates and publishes an associated public key element h of the ring R. Another user of the system, referred to as the Verifier, selects a random challenge bit string C and applies a hash function to C to generate challenge elements $(m_1, m_2) = \text{Hash}(C)$ in R. The Verifier transmits $m_1$ and $m_2$ to the Prover. The Prover generates a response element s using the private key (f,g) and the elements $m_1$ and $m_2$. The Prover sends the response element s to the Verifier. The Verifier uses the element s and the public key element h to generate the element $t = h*s$ modulo q. The Verifier checks that the pair of elements (s,t) is sufficiently close to the pair of elements $(m_1, m_2)$ for a specified distance function in the ring R. If this condition is satisfied, then the Verifier accepts the identity of the Prover. The Verifier may use the above-noted comparison for secure identification of the Prover, for authentication of data transmitted by the Prover, or for other secure communication functions.

In accordance with another aspect of the invention, a digital signature technique is provided. A Prover applies a hash function to a digital document M to generate challenge elements $(m_1, m_2) = \text{Hash}(M)$ in R. The Prover uses $m_1, m_2$, f, and g to generate a signature element s. The Prover publishes the digital document M and the signature s. The Verifier uses the element s and the public key element h to generate the element $t = h*s$ modulo q. The Verifier checks that the pair of elements (s,t) is sufficiently close to the pair of elements $(m_1, m_2) = \text{Hash}(M)$ for a specified measure distance function in the ring R. If this condition is satisfied, then the Verifier accepts the signature of the Prover on the message M.

Further features and advantages of the invention will become more readily apparent from the following detailed description when taken in conjunction with the accompanying drawings.

DETAILED DESCRIPTION OF THE PREFERRED EMBODIMENTS

Figure 1:
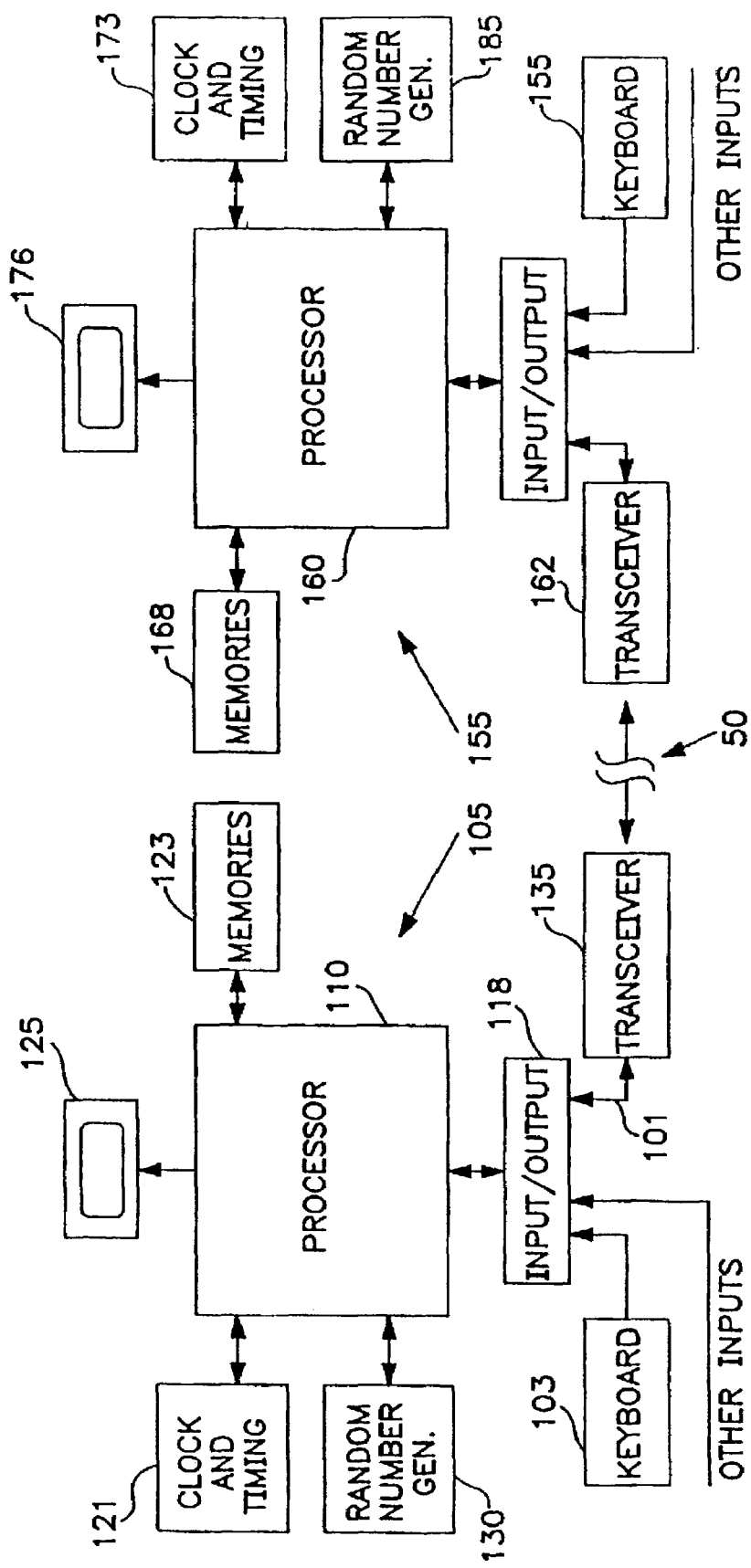
FIG. 1 is block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The processors may be, for example, Intel Pentium processors. The subsystem 105 will typically include memories 123, clock and timing circuitry 121, input/output functions 118 and monitor 125, which may all be of conventional types. Inputs can include a keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a monitor 176. Inputs include a keyboard 155. Communication of subsystem 155 with the outside world is via transceiver 162 which, again, may comprise a modem or any suitable device for communicating signals.

The user identification and digital signature techniques in accordance with the present invention are based on multiplication and reduction modulo an ideal in a ring. An exemplary embodiment of the present invention is based on multiplication of constrained polynomials over a ring and reduction modulo an ideal. An exemplary ring $R=Z[X]/(X^N-1)$ is a ring of polynomials with integer coefficients modulo the ideal generated by the polynomial $X^N-1$, an exemplary ideal of R is the ideal generated by an integer q, and an exemplary quotient of R is the ring $R/qR=(Z/qZ)[X]/(X^N-1)$ of polynomials with coefficients in the finite ring $Z/qZ$ modulo the ideal generated by the polynomial $X^N-1$.

The identification and digital signature techniques make use of the multiplication rule in the ring R. Given a polynomial $A(X)=A_0+A_1X+\ldots+A_{N-1}X^{N-1}$ in R and a polynomial $B(X)=B_0+B_1X+\ldots+B_{N-1}X^{N-1}$ in R, an exemplary product may be given by:

$$C(X)=A(X)*B(X)=C_0+C_1X+\ldots+C_{N-1}X^{N-1}$$

where $C_0,\ldots,C_{N-1}$ are given by:

$$C_i=A_0B_i+A_1B_{i-1}+\ldots+A_iB_0+A_{i+1}B_{N-1}+A_{i+2}B_{N-2}+\ldots+A_{N-1}B_{i+1}.$$

This exemplary product is known as a convolution product. All reference to multiplication of polynomials in the remaining description should be understood to refer to the above-described exemplary multiplication in R. It should also be noted that the above-described multiplication rule is not a requirement of the invention, and alternative embodiments may use other types of multiplication rules in other types of rings.

An exemplary product in the ring R is $h(X)=f^1(X)*g(X)$, where $f(X)$ is selected from a set of constrained polynomials $R_f$ and $g(X)$ is selected from a set of constrained polynomials $R_g$, and where $f^1(X)$ in R is an inverse for $f(X)$ in R/qR. An exemplary set of constrained polynomials $R_f$ is the set of polynomials in R with bounded coefficients, or more specifically the set of binary polynomials with a specified number of ones. An exemplary set of constrained polynomials $R_g$ is the set of polynomials in R with bounded coefficients, or more specifically the set of binary polynomials with a specified number of ones. Given two constrained polynomials $f(X)$ in $R_f$ and $g(X)$ in $R_g$, it is relatively easy to find the inverse $f(X)^{-1}$ in the ring R/qR and to compute the product $h(X)=f(X)^{-1}*g(X)$ in R. However, appropriately selected restrictions on the set of constrained polynomials can make it extremely difficult to invert this process and determine polynomials $f(X)$ in $R_f$ and $g(X)$ in $R_g$ such that $f(X)^{-1}*g(X)$ is equal to $h(X)$. An exemplary choice is q=128, N=251, $R_f$ is the set of binary polyomials with 73 ones and 178 zeros, and $R_g$ is the set of binary polynomials with 71 ones and 180 zeros. Those skilled in the art will readily derive other choices for which it is infeasible to recover $f(X)$ and $g(X)$ or any other equivalent pair when given only $h(X)$. As will be described in greater detail below, this provides a one-way function that is particularly well-suited to use in implementing efficient user identification and digital signatures.

Figure 2:
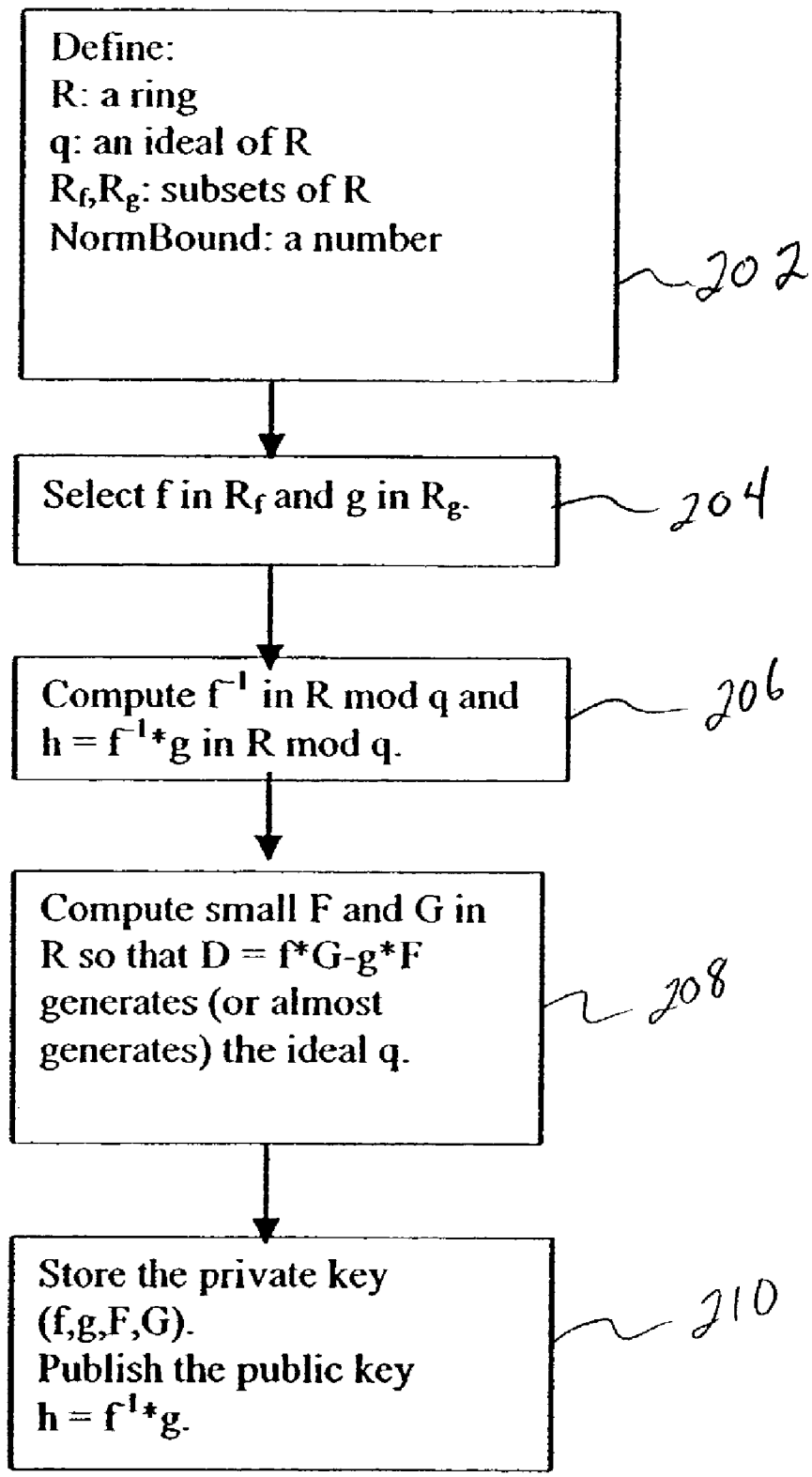
FIG. 2 is a flow diagram that illustrates a key creation technique in accordance with an exemplary embodiment of the present invention.

An exemplary identification technique in accordance with the invention uses a number of system parameters which are established by a central authority and made public to all users. These system parameters include the above-noted numbers N and q. The system parameters also include appropriate sets of bounded coefficient polynomials $R_f, R_g$, a formula to measure the distance between elements of $R^2$, and a number NormBound to use during the verification process. FIG. 2 illustrates the creation of a public/private key pair. After establishment of parameters in step 202, a Prover randomly chooses secret polynomials $f(X)$ in $R_f$ and $g(X)$ in $R_g$ in step 204. The Prover computes the inverse $f(X)^{-1}$ of $f(X)$ in the ring R/qR in step 206. The private key of the Prover includes the two polynomials $f(X)$ and $g(X)$. In order to improve efficiency in step 208, the Prover may precompute two additional polynomials $F(X)$ and $G(X)$ in R that have bounded size and that satisfy the equation $$f(X)*G(X)-g(X)*F(X)=q.$$

The public key of the Prover is the polynomial $h(X)=f(X)^{-1}*g(X)$. The Prover publishes the public key in step 210.

Figure 3:
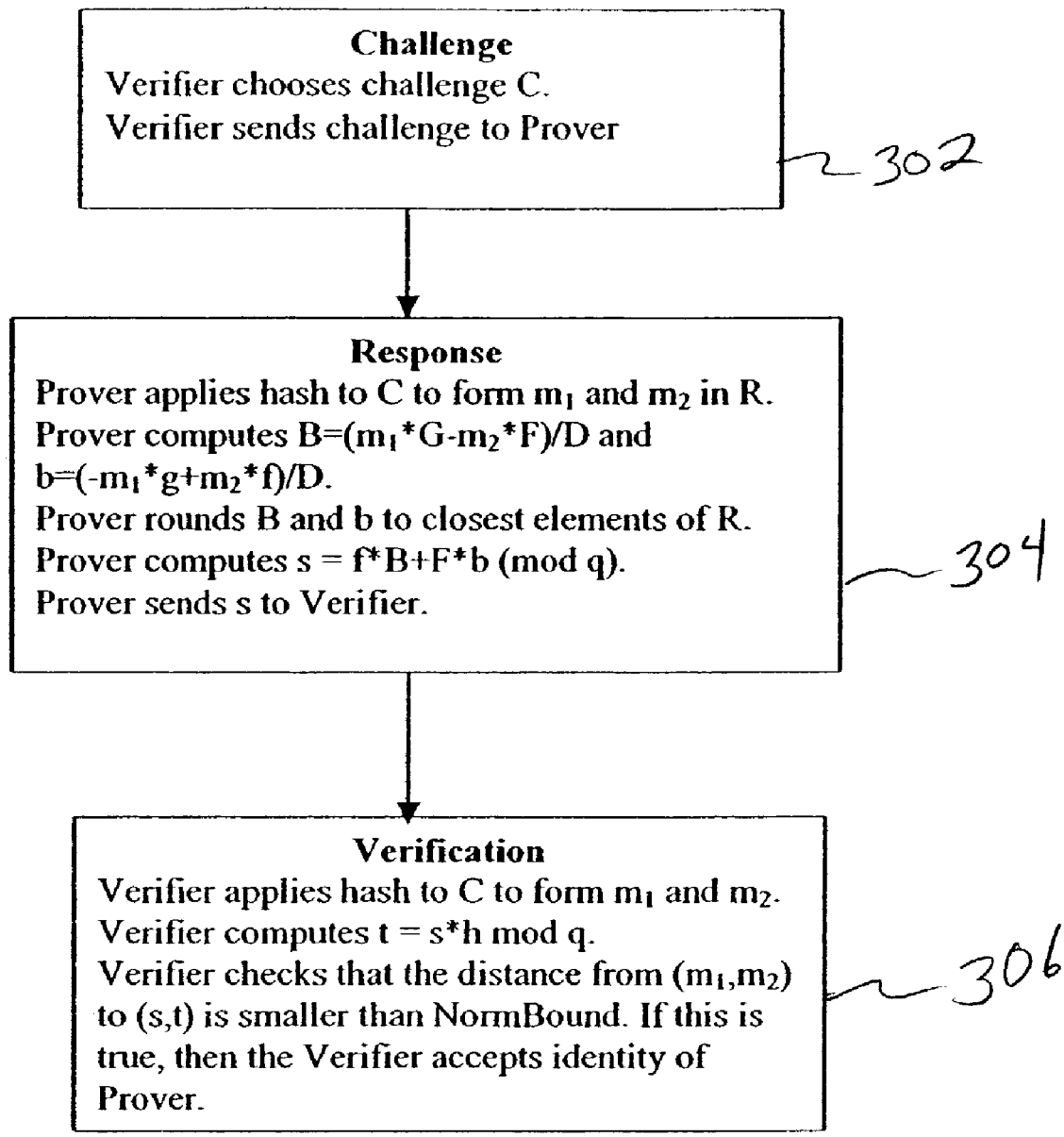
FIG. 3 is a flow diagram that illustrates a user identification technique in accordance with an exemplary embodiment of the present invention.

FIG. 3 illustrates an exemplary identification process. The Verifier initiates the Challenge Phase in step 302 by generating a challenge C and sending it to the Prover. The Prover initiates the Response Phase in step 304 by applying a hash function to the challenge C to form polynomials $m_1(X)$ and $m_2(X)$ in R. The Prover uses the private key polynomials to compute the response polynomial $s(X)$ so that $(s,t)$ is close to $(m_1,m_2)$, where $t(X)=h(X)*s(X)$ in R/qR. The computation of the response polynomial may be performed using the following steps:

Compute $B=(m_1*G-m_2*F)/q$ and $b=(-m_1*g+m_2*f)/q$ in $Q[X]/(X^N-1)$.

Round the coefficients of B and b to the nearest integer, so now B and b are in $R=Z[X]/(X^N-1)$.

Compute $s=f*B+F*b \pmod{q}$

The Prover sends $s(X)$ to the Verifier. The Verifier initiates the Verification Phase in step 306 by applying the hash function to C to form the polynomials $m_1(X)$ and $m_2(X)$. The Verifier computes the polynomial $t(X)=h(X)*s(X)$ in R/qR. The Verifier tests that the distance from $(s,t)$ to $(m_1,m_2)$ is smaller than NormBound. The Verifier accepts the Prover as legitimate if the response polynomial $s(X)$ transmitted by the Prover passes this test.

The following is an example of operating parameters that provide a practical cryptographically secure identification/digital signature scheme under current conditions for an embodiment in accordance with the invention of an identification scheme.

N=251, q=128, NormBound=350, $R_f$={binary polynomials with 73 ones and 148 zeros}

$R_g$={binary polynomials with 71 ones and 150 zeros}

Distance measured by centered Euclidean norm

Those skilled in the art will readily derive other choices that provide practical cryptographically secure identification/digital signature schemes at various security levels.

Figure 4:
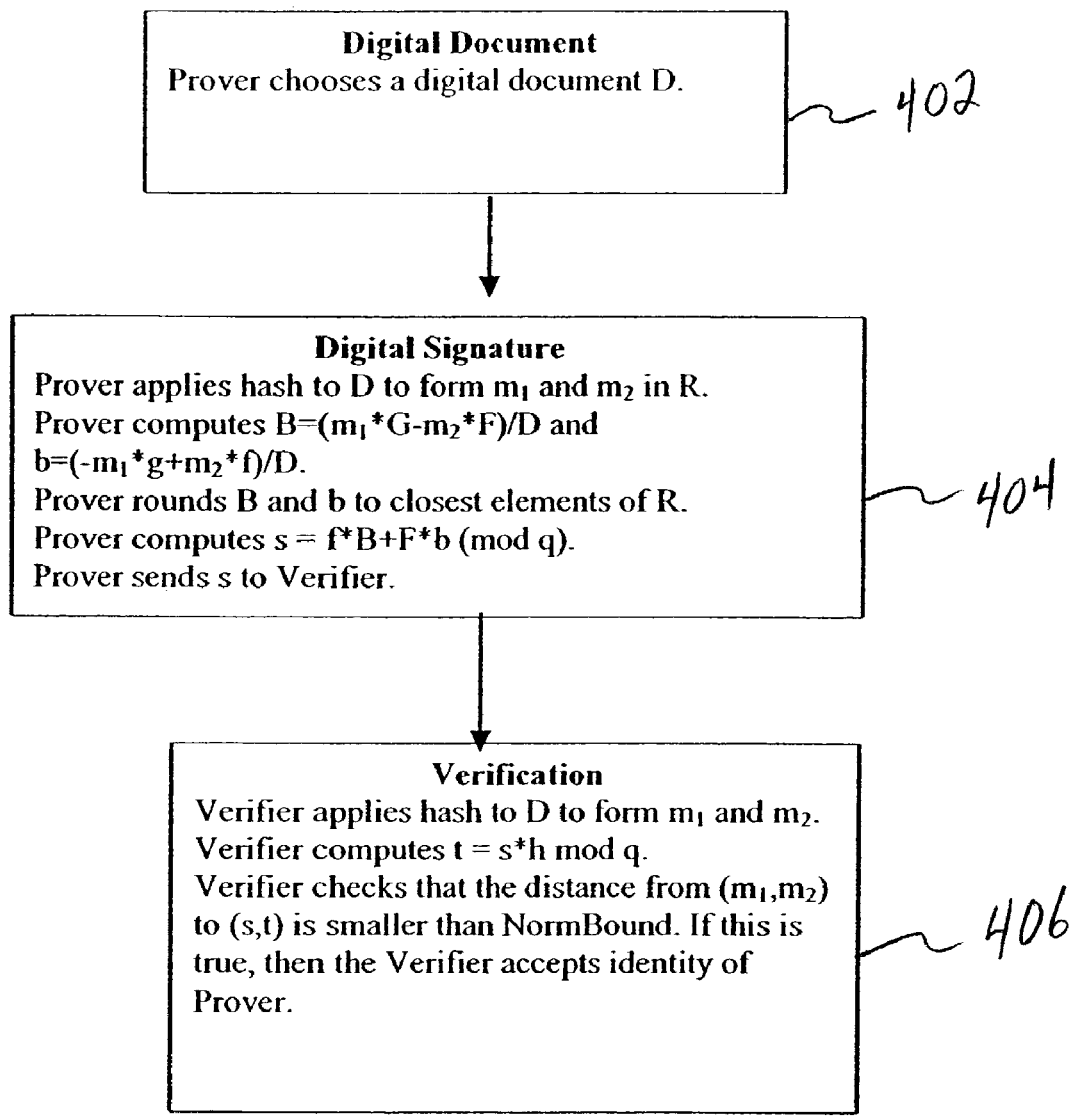
FIG. 4 is a flow diagram that illustrates a digital signature technique in accordance with an exemplary embodiment of the present invention.

Any authentication scheme involving the steps of
Challenge/Response/Verification can be turned into a digital signature scheme. The basic idea is to use a hash function (see below) to create the challenge from the digital document to be signed. FIG. 4 illustrates an exemplary digital signature process. The steps that go into a digital signature are as follows:

Key Creation (Digital Signature)

The Signer creates the private signing key (f(X), g(X), F(X), G(X)) and the public verification key h(X) exactly as in the identification scheme.

Signing Step 1. Challenge Step (Digital Signature)

The Signer applies a hash function H (see below) to the digital document D in step 404 that is to be signed to produce the challenge polynomials $m_1(X)$ and $m_2(X)$.

Signing Step 2. Response Step (Digital Signature)

This is the same as for the identification scheme The Signer uses the private key polynomials to compute the signature polynomial s(X) so that (s,t) is close to $(m_1,m_2)$, where t(X)=h(X)*s(X) in R/qR. The Signer publishes the pair (D,s(X)) consisting of the digital document and the signature.

Verification Step (Digital Signature)

The Verifier applies the hash function H to the digital document D to produce the polynomials $m_1(X)$ and $m_2(X)$ in step 406. The verification procedure is now the same as in the identification scheme. The Verifier computes the polynomial t(X)=h(X)*s(X) in R/qR. The Verifier tests that the distance from (s,t) to $(m_1,m_2)$ is smaller than Norm-Bound. If s(X) passes this test, then the Verifier accepts the digital signature on the document D.

Further details of an exemplary embodiment of the present invention are described in Appendix A, including exemplary methods for selecting parameters to obtain desired security levels and exemplary methods for efficient implementation of the invention. Appendix A, entitled "APPENDIX A, NTRUSIGN: DIGITAL SIGNATURES USING THE NTRU LATTICE" is incorporated herein and forms part of the present specification.

Hash functions, which are well known in the art, are used herein. The purpose of a hash function is to take an arbitrary amount of data as input and produce as output a small amount of data (typically between 80 and 160 bits) in such a way that it is very hard to predict from the input exactly what the output will be. For example, it should be extremely difficult to find two different sets of inputs that produce the exact same output. Hash functions may also be used in ways that are well known in the art to produce longer streams of data. An exemplary method for using hash functions to produce longer streams of data is known in the art as counter mode; the input data is concatenated to a counter and hashed repeatedly as the counter is increased. Hash functions are used for a variety of purposes in cryptography and other areas of computer science.

It is a nontrivial problem to construct good hash functions. Typical hash functions such as SHA1 and MD5 proceed by taking a chunk of input, breaking it into pieces, and doing various simple logical operations (e.g., and, or, shift) with the pieces. This is generally done many times. For example, SHA1 takes as input 512 bits of data, it does 80 rounds of breaking apart and recombining, and it returns 160 bits to the user. The process can be repeated for longer messages.

The user identification and digital signature techniques of the present invention provide significantly improved computational efficiency relative to the prior art techniques at equivalent security levels, while also reducing the amount of information that must be stored by the Prover and Verifier. It should be emphasized that the techniques described above are exemplary and should not be construed as limiting the present invention to a particular group of illustrative embodiments. Alternative embodiments within the scope of the appended claims will be readily apparent to those skilled in the art.

The invention claimed is:

1. A method for signing and verifying a digital document D, comprising the following steps implemented using at least one processor-based subsystem:

selecting a ring R, an ideal q of R, and a hash function;

generating elements f and g of the ring R, and generating an element $f^{-1}$ that is an inverse of f in the ring R modulo q;

producing a public key that includes h, where h is equal to a product that can be derived using g and $f^{-1}$;

producing a private key from which f and g can be derived;

producing additional elements F and G in R derived from the private key, wherein the element E=f*G−g*F is in the ideal q, and wherein the quotient q/(E) is a small finite set;

producing a message digest m by applying the hash function to the digital document D;

producing a digital signature s by producing elements B and b in R that are derived from the elements f, g, F, G and from the message digest m, the digital signature s being derived by the formula f*B−F*b (mod g); and verifying the digital signature s by verifying one or more specified conditions using the digital document D and the public key.

2. The method of claim 1 wherein a specified condition on the digital signature s is that a quantity derived from s satisfies a specified relation with a quantity derived from the message digest m.

3. The method of claim 1 wherein a specified condition on the digital signature s is that an element t of the ring R derived from the product of the digital signature s and the public key h modulo q satisfies a specified condition relation with a quantity derived from the message digest m.

4. The method defined by claim 1 wherein the specified conditions include the condition that $m=(m_1,m_2)$ and that B is derived from $(m_1*G−m_2*F)/D$.

5. The method defined by claim 1, wherein the specified conditions include the condition that $m=(m_1,m_2)$ and that b is derived from $(-g*m_1+f*m_2)/D$.

6. A method for signing and verifying a digital document D, comprising the following steps implemented using at least one processor-based subsystem:

selecting a hash function;

selecting an integer q;

generating polynomials f and g;

determining the inverse $f^{-1}$, where $f^{-1} * f \equiv 1 \pmod{q}$;

producing a public key that includes h, where $h = f^{-1} * g \pmod{q}$;

producing a private key that includes f and g;

producing polynomials F and G, wherein F and G satisfy the condition $f*G−g*F=q$;

producing a message digest m by applying the hash function to the digital document D;

producing a digital signature s by digitally signing the message digest m using the private key wherein said signature s may be derived from the quantity $$f*B + F*b \pmod{g},$$

wherein B and b satisfy one or more specified conditions; and verifying the digital signature on the digital document D by verifying one or more specified conditions using the hash function, the public key h, the digital signature s, and the integer q.

7. The method defined by claim 6, wherein the message digest m includes two polynomials $m_1$ and $m_2$.

8. The method as defined in claim 6, wherein a monic polynomial M(X) is selected and multiplication of polynomials is accomplished by first performing ordinary multiplication of polynomials and then dividing the result by M(X) and retaining only the remainder.

9. The method as defined in claim 6, wherein a non-zero integer N is selected and multiplication of polynomials is accomplished by reducing exponents modulo N.

10. The method defined in claim 6 wherein the specified conditions include the condition that is derived from $(m_1*G - m_2*F)/q$.

11. The method defined by claim 6 wherein the specified conditions include the condition that b is derived from $(-g*m_1 = f*m_2)/q$.

12. The method defined by claim 7, wherein said verification includes the specified condition that the polynomials s, t, $m_1$, $m_2$ satisfy one or more specified conditions, wherein t is the product of the digital signature s and the public key h modulo q.

13. The method defined by claim 12, wherein a specified condition on the polynomials s, t, $m_1$, $m_2$ is the condition that (s,t) is close to $(m_1, m_2)$ for a specified method of measuring distance in $R^2$.

14. The method defined by claim 13, wherein the specified method of measuring distance is a distance function on the vector of coefficients of a polynomial.

15. The method defined in claim 6, wherein said polynomials f and g are constrained to have bounded coefficients.

16. The method defined in claim 6, wherein said polynomials f, g, F, and G are constrained to have bounded coefficients.

17. The method defined by claim 7, wherein the polynomial $m_1$ is the zero polynomial.

18. The method defined by claim 7, wherein the polynomial $m_2$ is the zero polynomial.

19. The method as defined in claim 6, wherein the digital signature is produced by a user at one location, transmitted from said one location to another location, and verified by a user at said another location.

20. The method as defined by claim 1, wherein all of said steps of producing said digital signature are implemented using a first processor-based subsystem, and said step of verifying said digital signature is implemented using a second processor-based subsystem.

21. The method as defined by claim 1, wherein the digital signature is produced by a user at one location, transmitted from said one location to another location, and verified by a user at said another location.

22. The method as defined in claim 20, wherein the digital signature is produced by a user at one location, transmitted from said one location to another location, and verified by a user at said another location.

23. The method as defined by claim 6, wherein all of said steps of producing said digital signature are implemented using a first processor-based subsystem, and said step of verifying said digital signature is implemented using a second processor-based subsystem.

24. The method as defined in claim 23, wherein the digital signature is produced by a user at one location, transmitted from said one location to another location, and verified by a user at said another location.

* * * * *